US011718776B2

(12) United States Patent
Wagle et al.

(10) Patent No.: US 11,718,776 B2
(45) Date of Patent: Aug. 8, 2023

(54) METHOD TO USE LOSS CIRCULATION MATERIAL COMPOSITION COMPRISING ACIDIC NANOPARTICLE BASED DISPERSION AND SODIUM BICARBONATE IN DOWNHOLE CONDITIONS

(71) Applicant: SAUDI ARABIAN OIL COMPANY, Dhahran (SA)

(72) Inventors: Vikrant Wagle, Dhahran (SA); Rajendra Arunkumar Kalgaonkar, Dhahran (SA); Abdullah AlYami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/552,395

(22) Filed: Dec. 16, 2021

(65) Prior Publication Data

US 2023/0193112 A1 Jun. 22, 2023

(51) Int. Cl.
*C09K 8/514* (2006.01)
*C09K 8/504* (2006.01)
*C01B 33/14* (2006.01)

(52) U.S. Cl.
CPC .......... *C09K 8/5045* (2013.01); *C01B 33/14* (2013.01); *C09K 8/514* (2013.01); *C01P 2004/64* (2013.01); *C01P 2006/10* (2013.01); *C01P 2006/12* (2013.01); *C09K 2208/10* (2013.01)

(58) Field of Classification Search
CPC .............................. C09K 8/5045; C09K 8/514
See application file for complete search history.

(56) References Cited

U.S. PATENT DOCUMENTS

| | | | |
|---|---|---|---|
| 4,732,213 A | 3/1988 | Bennett et al. | |
| 5,268,112 A | 12/1993 | Hutchins et al. | |
| 5,320,171 A | 6/1994 | Laramay | |
| 7,013,973 B2 | 3/2006 | Danican et al. | |
| 7,458,424 B2 | 12/2008 | Odeh et al. | |
| 7,934,557 B2 | 5/2011 | Nguyen | |
| 7,954,549 B2 | 6/2011 | Lende et al. | |
| 8,741,818 B2 | 6/2014 | Ravi et al. | |
| 9,045,965 B2 | 6/2015 | Patil et al. | |
| 9,133,386 B2 | 9/2015 | Kumar et al. | |
| 10,053,613 B1 | 8/2018 | Kalgaonkar et al. | |
| 10,113,406 B1* | 10/2018 | Gomaa | C09K 8/703 |
| 10,233,380 B1 | 3/2019 | Wagle et al. | |
| 10,316,238 B2 | 6/2019 | Wagle et al. | |
| 10,351,755 B2 | 7/2019 | Wagle et al. | |
| 10,407,609 B2 | 9/2019 | Kalgaonkar et al. | |
| 10,570,699 B2 | 2/2020 | Wagle et al. | |
| 10,577,526 B2 | 3/2020 | Wagle et al. | |
| 10,619,083 B2 | 4/2020 | Wagle et al. | |
| 10,767,094 B2 | 9/2020 | Wagle et al. | |
| 2005/0221994 A1 | 10/2005 | Xiang | |
| 2011/0094746 A1 | 4/2011 | Allison et al. | |
| 2013/0292120 A1 | 11/2013 | Patil et al. | |
| 2014/0116695 A1* | 5/2014 | Maghrabi | C09K 8/36 166/279 |
| 2014/0158354 A1 | 6/2014 | Kumar et al. | |
| 2016/0201433 A1 | 7/2016 | Kalgaonkar et al. | |
| 2017/0137694 A1 | 5/2017 | van Oort et al. | |
| 2017/0233640 A1* | 8/2017 | Chopade | E21B 43/26 166/308.5 |
| 2018/0223152 A1* | 8/2018 | Wagle | C09K 8/035 |
| 2018/0320053 A1 | 11/2018 | Kalgaonkar et al. | |
| 2019/0055456 A1 | 2/2019 | Wagle et al. | |
| 2019/0161668 A1 | 5/2019 | Wagle et al. | |
| 2019/0276724 A1 | 9/2019 | Wagle et al. | |
| 2021/0403798 A1 | 12/2021 | Kalgaonkar et al. | |
| 2022/0010193 A1 | 1/2022 | Wagle et al. | |

FOREIGN PATENT DOCUMENTS

| | | |
|---|---|---|
| WO | 2013165717 A1 | 11/2013 |
| WO | 2015041703 A1 | 3/2015 |
| WO | 2018144663 A1 | 8/2018 |
| WO | 2019051140 A1 | 3/2019 |
| WO | 2019051142 A1 | 3/2019 |

OTHER PUBLICATIONS

Stenstrøm, Henrik, "Nano silica treated water based drilling fluid formulation and analysis in various polymers and salts systems", Master's Thesis, University of Stavanger, Dec. 21, 2015 (150 pages).
Wagle, Vikrant, et al., "Nanosilica-Based Loss Circulation Composition to Cure Moderate to Severe Losses", Journal of Energy Resources Technology, ASME, vol. 143, Oct. 2021, pp. 103002-1-103002-12 (12 pages).
Wagel, Vikrant, et al., "Novel Loss Circulation Composition to Treat Moderate to Severe Loss", SPE-194653-MS, Society of Petroleum Engineers, Apr. 2019, pp. 1-12 (12 pages).
International Search Report issued in related International Application No. PCT/US2020/045354, dated Apr. 1, 2021 (4 pages).
Written Opinion issued in related International Application No. PCT/US2020-045354, dated Apr. 1, 2021 (8 pages).

(Continued)

*Primary Examiner* — Alicia Bland

(74) *Attorney, Agent, or Firm* — Osha Bergman Watanabe & Burton LLP

(57) ABSTRACT

Provided is a loss circulation material that may consist essentially of an acidic nanosilica dispersion and an activator. The acidic nanosilica dispersion may consist of acidic silica nanoparticles, stabilizer, and water, and may have a pH in a range of 3 to 6. The activator may be one or more from the group consisting of sodium bicarbonate, sodium chloride, or an amine salt. A method is provided for controlling lost circulation in a lost circulation zone in a wellbore comprising introducing the loss circulation material and forming a gelled solid from the loss circulation material in the lost circulation zone.

17 Claims, No Drawings

(56) References Cited

OTHER PUBLICATIONS

Office Action issued in related U.S. Appl. No. 16/922,512, dated Jun. 14, 2021 (28 pages).
Office Action issued in related U.S. Appl. No. 16/922,512, dated Oct. 4, 2021 (18 pages).
Notice of Allowance issued in related U.S. Appl. No. 16/922,512, dated Jan. 4, 2022 (24 pages).

* cited by examiner

METHOD TO USE LOSS CIRCULATION MATERIAL COMPOSITION COMPRISING ACIDIC NANOPARTICLE BASED DISPERSION AND SODIUM BICARBONATE IN DOWNHOLE CONDITIONS

FIELD OF THE DISCLOSURE

One or more embodiments of the present disclosure generally relates to loss circulation material (LCM) and use of the LCMs in downhole conditions. LCMs described herein may be used in the oil and gas drilling industries, or other suitable industries that may drill wellbores like oil wells and gas wells.

BACKGROUND

In wellbore drilling, a drilling fluid (or drilling mud) is circulated from a surface of the wellbore to downhole through the drill string. The fluid exits through ports (or jets) in the drill bit. The fluid picks up cuttings and carries the cuttings up an annulus formed between an inner wall of the wellbore and an outer wall of the drill string. The fluid and the cuttings flow through the annulus to the surface, where the cuttings are separated from the fluid. The fluid can be treated with chemicals and then pumped into the wellbore through the drill string to repeat the process.

During the drilling of subterranean wells, such as subterranean wells used in hydrocarbon development operations, the wellbore of the subterranean well can pass through a zone that has induced or natural fractures, are cavernous, or otherwise have an increased permeability compared with solid rock. Such a zone is known as a lost circulation zone. In such a case, the drilling mud and other fluids that are pumped into the well can flow into the lost circulation zone and become irretrievable. Thus, lost circulation is a situation in which the flow of the drilling fluid up the annulus toward the surface is reduced or is totally absent.

When unacceptable drilling fluid losses are encountered, loss circulation materials (LCM) are introduced into the drilling fluid from the surface. The revised fluid that includes the loss circulation materials is pumped downhole as part of the standard well circulation system. The revised fluid passes through a circulation port to plug and pressure seal the exposed formation at the point where losses are occurring. Once sealing has occurred and acceptable fluid loss control is established, drilling operations can resume.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

One or more embodiments provides a loss circulation material composition that may include an acidic nanosilica dispersion with acidic silica nanoparticles, a stabilizer, and water. The acidic nanosilica dispersion may have a pH in a range of 3 to 6. The composition may include an activator present in an amount in a range of 1 to 40 weight percent (wt %) of the loss circulation material. Optionally, the loss circulation material composition may include a cationic species that is a positive ion or a cationic polymer, a viscosifier, or a salt.

In one or more embodiments, a method to use the loss circulation material composition may include controlling lost circulation in a lost circulation zone in a wellbore. The method may include introducing the loss circulation material composition, consisting essentially of an acidic nanosilica dispersion and an activator, into the wellbore. In the wellbore, the acidic nanosilica dispersion and the activator contact the lost circulation zone. The activator may be present in an amount in a range of 1 to 40 wt % of the loss circulation material. In some embodiments, the acidic nanosilica dispersion and the activator may not be premixed. Following contact in the lost circulation zone, a gelled solid is formed from the loss circulation material in the lost circulation zone, reducing or eliminating lost circulation.

In one or more embodiments, a method to use the loss circulation material composition may include controlling lost circulation in a lost circulation zone in a wellbore. The method may include introducing the loss circulation material composition, consisting essentially of an acidic nanosilica dispersion and an activator, into the wellbore. In the wellbore, the acidic nanosilica dispersion and the activator contact the lost circulation zone. The activator may be present in an amount in a range of 1 to 40 wt % of the loss circulation material. In some embodiments, the acidic nanosilica dispersion and the activator may be premixed before introduction into the wellbore, and following introduction of the mixture into the wellbore, a gelled solid is formed from the loss circulation material in the lost circulation zone.

Other aspects and advantages of this disclosure will be apparent from the following description made with reference to the accompanying appended claims.

DETAILED DESCRIPTION

One or more embodiments in accordance with the present disclosure relate to loss circulation materials and methods to use such loss circulation materials (LCM) in downhole conditions. More specifically, embodiments herein are directed to convertible compositions and methods for producing a solid gel based loss circulation material from the convertible composition. In particular, embodiments herein are directed toward a convertible composition including an acidic nanosilica dispersion and producing a solid gel based loss circulation material by contacting the acidic nanosilica dispersion with an activator.

In one or more embodiments, the convertible composition, a combination of an acidic nanosilica dispersion and activator, forms a gelled solid based loss circulation material (LCM). In one or more embodiments, the activator gels the acidic nanosilica dispersion.

The formation of gels using the combination of nanosilica dispersions and activator according to embodiments herein may decrease loss of drilling fluids in any suitable type of lost circulation zone. As used throughout, "lost circulation zone" refers to an area encountered during drilling operations where the volume of drilling fluid returning to the surface is less than the volume of drilling fluid introduced to the wellbore. The lost circulation zone can be due to any kind of opening between the wellbore and the subterranean formation. Lost circulation zones that can be addressed by the solid gel based loss circulation material from a convertible composition described herein can range from minor lost circulation or seepage loss to complete fluid loss.

For instance, minor lost circulation and seepage lost circulation is generally less than 10 barrels per hour (bbl/hr). However, minor lost circulation and seepage lost circulation can be greater or less than 10 bbl/hr depending on the base components of the drilling fluid and other suitable conditions. One of skill in the art would appreciate the various conditions that can define a minor or seepage lost circulation event.

"Moderate lost circulation" is a term for any lost circulation between seepage lost circulation and severe lost circulation and consists of any medium rate of lost circulation, for example, between 10 to 100 bbl/hr, 10 to 50 bbl/hr, or 10 to 30 bbl/hr.

"Severe lost circulation" is a term including any suitable high rate of lost circulation. Non-limiting examples of severe loss circulation include greater than 100 bbl/hr, greater than 50 bbl/hr, or greater than 30 bbl/hr.

In one or more embodiments, the acidic nanosilica dispersion may be introduced into the wellbore such that the acidic nanosilica dispersion contacts the lost circulation zone. Subsequently, the activator may be introduced into the lost circulation zone in downhole conditions to contact the acidic nanosilica dispersion. Contact of the activator with the acidic nanosilica dispersion results in the formation of a gelled solid formed from the reaction of the acidic nanosilica dispersion and the activator, reducing the rate of lost circulation in the lost circulation zone.

Without wanting to be bound by theory, addition of an activator to the acidic nanosilica dispersion results in weakened repulsive interactions between the acidic silica nanoparticles, leading to collisions of the nanoparticles in the dispersion. Collision of nanoparticles results in aggregation of nanosilica into long chain-like networks caused by formation of siloxane (Si—O—Si) bonds and subsequently results in gelling of the acidic nanosilica dispersion.

This aggregation may be controlled by an acidic nanosilica dispersion that is either premixed or not premixed prior to introduction of the loss circulation material composition downhole. For example, acidic nanosilica dispersion and activator that is premixed may provide a quicker gelling time compared to acidic nanosilica dispersion and activator that is not premixed. In some instances a quicker gelling time may be advantageous and in other instances a slower gelling time may be advantageous.

In other embodiments, the acidic nanosilica dispersion and the activator may be mixed and then subsequently introduced into the lost circulation zone. The mixture thus introduced to the lost circulation zone may form a gelled solid, resulting in decreased fluid loss.

In some embodiments, the gelling time (the time for which the nanosilica dispersion begins to form a gel) of the acidic nanosilica dispersion may be controlled. For example, the gelling time may be affected by the concentration of activator used. The gelling tendency of the system may be accelerated by changing the pH of the system from acidic to alkaline, where the more alkaline the system, the faster the gel formation occurs. The amount of activator used, for example, may thus depend upon the method used for introduction of the LCM into the lost circulation zone; when pre-mixed, a longer gel time may be desirable. In one or more embodiments, the time to form a gelled solid is from 6 to 36 hours, from 6 to 24 hours, from 6 to 20 hours, from 8 to 20 hours, from 10 to 20 hours, from 1 to 24 hours, from 1 to 20 hours, or from 1 to 18 hours.

In at least one embodiment of the method to produce a solid gel loss circulation material, when a lost circulation zone is encountered, a convertible composition pill is produced by mixing the acidic nanosilica dispersion and the activator. The convertible composition pill can be introduced into the wellbore. The convertible composition pill can be allowed to migrate to the lost circulation zone. The volume of the convertible composition pill can be based on the size of the lost circulation zone, as estimated based on the volume of lost drilling fluid. The amount of chemical activator can be based on the desired gel formation time. The solid gel loss circulation material then forms in the lost circulation zone and the solid gel loss circulation material fills the lost circulation zone, reducing or eliminating fluid loss. Similar considerations and effects may be use in other embodiments where the acidic nanosilica dispersion is introduced to the wellbore in a first pill prior to contact of the nanosilica with the activator, introduced in a second pill.

Embodiments herein may be useful over a wide range of downhole conditions, including temperatures of up to about 200° C., such as up to about 175° C., up to about 150° C., up to about 125° C., or up to about 100° C. Downhole pressures may be from about 50 pounds per square inch (psi) (0.345 megapascals (MPa)) to about 30,000 psi (206 MPa), such as from about 100 psi (0.689 MPa) to about 30,000 psi, from about 1,000 psi (6.90 MPa) to about 30,000 psi, from about 50 psi to about 20,000 psi (138 MPa), from about 100 psi to about 20,000 psi (68.9 MPa), from about 1,000 psi to about 20,000 psi, from about 50 psi to about 10,000 psi, from about 100 psi to about 20,000 psi, or from about 1,000 psi to about 10,000 psi. At these downhole conditions, the composition may solidify within 16 hours (gelling time) downhole. The gelling time is not limited to 16 hours and may be less, such as 14 hours or less, 12 hours or less, or 10 hours or less.

As described above, loss circulation materials according to embodiments herein may be formed from an acidic silica nanoparticle dispersion and an activator.

Acidic silica nanoparticles useful according to embodiments herein may include nanoparticles formed from a suitable silica source, for example, sodium silicate. Thus, the composition may include sodium silicate as well as acidic silica nanoparticles.

In one or more embodiments, the composition includes a stabilizer. The acidic nanosilica particles may be stabilized by the stabilizer. Examples of a suitable stabilizer include, but is not limited to oxy chloride, organic acids, and mineral acids. An organic acid may include but is not limited to acetic acid, formic acid, lactic acid, citric acid, oxalic acid, uric acid, malic acid, tartaric acid, and a combination thereof. A mineral acid may include but is not limited to hydrochloric acid, hydrofluoric acid, hydrobromic acid, hydriodic acid, boric acid, phosphoric acid, perchloric acid, sulfuric acid, nitric acid, and a combination thereof.

The acidic nanosilica dispersion may have a pH between 3 and 6. In one or more embodiments, the acidic nanosilica dispersion may have a pH between 3 and 5, or a pH between 3 and 4, when measured at room temperature.

The acidic silica nanoparticle may have any suitable particle size for the application, including: 0.1-1000 nm, 500-1000 nm, 0.1-500 nm, 1-300 nm, 10-200 nm, 10-70 nm, 20-100 nm, 30-80 nm, 40-70 nm, 40-60 nm, and 40-50 nm. The nanoparticles as provided may have a particle size distribution, which may be monodisperse or polydisperse.

The acidic silica nanoparticles may have a particle size between 1 nanometers (nm) and 100 nm, such as between 5 nm and 95 nm. In some embodiments the acidic silica nanoparticles may be between 5 nm and 50 nm, between 5 nm and 20 nm, between 20 nm and 40 nm, between 40 nm and 60 nm, between 60 nm and 80 nm, or between 80 nm and 100 nm.

The specific surface area of acidic silica nanoparticles may be between 100 square meters per gram ($m^2/g$) and 500 $m^2/g$, alternatively between 100 $m^2/g$ and 300 $m^2/g$, alternatively between 100 m²/g and 200 m²/g, alternatively between 100 m²/g and 400 m²/g, and alternatively between 150 m²/g and 200 m²/g. Without being bound to a particular theory, the greater surface area of the acidic silica nanoparticles (as compared to silica particles) can affect the rate of gelation and the nature of the gels formed. More specifically, the smaller particle size of the acidic silica nanoparticles in the acidic nanosilica dispersion promotes faster gelling than silica particles.

The acidic silica nanoparticles may have a density range of from about 1.0 gram per cubic centimeter (g/cc) (gram per milliliter (g/mL)) to about 2.0 g/cc (g/mL), such as from about 1.0 g/cc to about 1.8 g/cc, from about 1.0 g/cc to about 1.7 g/cc, from about 1.0 g/cc to about 1.6 g/cc, from about 1.0 g/cc to about 1.5 g/cc, from about 1.0 g/cc to about 1.4 g/cc, from about 1.05 g/cc to about 1.8 g/cc, from about 1.05 g/cc to about 1.7 g/cc, from about 1.05 g/cc to about 1.6 g/cc, from about 1.05 g/cc to about 1.5 g/cc, or from about 1.05 g/cc to about 1.4 g/cc.

An acidic nanosilica particle having the combination of particle size, specific surface area, and density may provide advantageous results including an ability to form a gelled solid, and a gelling time downhole.

The Brunauer, Emmett, and Teller (BET) specific surface area of the acidic silica nanoparticles may be between 100 square meters per gram (m²/g) and 500 m²/g, alternatively between 100 m²/g and 400 m²/g, alternatively between 100 m²/g and 300 m²/g, alternatively between 150 m²/g and 300 m²/g, and alternatively between 150 m²/g and 250 m²/g.

The concentration of the acidic silica nanoparticles in the acidic nanosilica dispersion may be between 5 percent by weight (wt %) and 60 wt %, the balance being water. The concentration of nanosilica in the acidic nanosilica dispersion may affect the rate of gel formation, the greater the concentration of nanosilica in the acidic nanosilica dispersion the faster rate of gel formation. The amount of the acidic nanosilica dispersion added to the aqueous based drilling mud may depend on the mud weight of the aqueous based drilling mud. The concentration of the acidic silica nanoparticles in the acidic nanosilica dispersion can be between 5 wt % and 50 wt %, such as in the range from about 10 wt % to 50 wt %, from about 15 wt % to 50 wt %, from about 15 wt % to 45 wt %, from about 15 wt % to 40 wt %, from about 15 wt % to 35 wt %, from about 15 wt % to 30 wt %, from about 20 wt % to 35 wt %, from about 20 wt % to 30 wt %, from about 20 wt % to 50 wt %, or from about 30 wt % to about 50 wt % compared to the total weight of the dispersion.

The density of the acidic silica nanoparticle dispersion may be in a range of from 1 to 5 g/cc (g/mL), such as from 1 to 4.5 g/cc (g/mL), from 1 to 4 g/cc (g/mL), from 1 to 3.5 g/cc (g/mL), from 1 to 3 g/cc (g/mL), from 1 to 2.5 g/cc (g/mL), from 1 to 2 g/cc (g/mL), or from 1 to 1.5 g/cc (g/mL).

The viscosity of the acidic silica nanoparticle dispersion may be in a range of from 1 to 50 centipoise (cP) at room temperature (from about 20° C. to about 25° C.) and low shear rate (from about 500 reciprocal seconds (s⁻¹) to about 550 s⁻¹, or from about 500 s⁻¹ to about 520 s⁻¹), such as from 1 to 25 cP, from 1 to 20 cP, from 1 to 15 cP, from 1 to 10 cP, or from 1 to 5 cP.

Formation of a gel according to embodiments herein may be initiated by contact of the above-described acidic silica nanoparticles with an activator. Activators useful according to embodiments herein may include or comprise sodium bicarbonate, sodium chloride, an amine salt, or a combination thereof. In other embodiments, the activator may consist of or consist essentially of sodium bicarbonate. When the composition has multiple activators, each activator may be introduced into the wellbore separately or simultaneously with another activator. Further, the activator(s) may be introduced separately or simultaneously with the overall composition.

The activator may be used at a weight ratio to the acidic nanosilica dispersion in a range from 0.01:1 to 1:1. As noted above, the ratio of the activator to the acidic nanosilica may impact the gelation time. Regarding the weight ratio of activator to acidic nanosilica dispersion, the top of the range is called the upper limit and the bottom of the range is called the lower limit. In some embodiments, the activator may be present in an amount in a range from 1 wt % to 40 wt % of the loss circulation material (inclusive of the activator and the acidic nanosilica dispersion); such as from a lower limit of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt % to an upper limit of 20 wt %, 21 wt %, 22 wt %, 23 wt %, 24 wt %, 25 wt %, 26 wt %, 27 wt %, 28 wt %, 29 wt %, 30 wt %, 35 wt %, or 40 wt %, where any lower limit may be combined with any mathematically compatible upper limit.

In some embodiments, the activator may be used at a weight ratio to the acidic silica nanoparticles in a range from about 1:1 to about 1:10, such as from about 1:1 to about 1:8, from about 1:1 to about 1:5, or from about 1:1 to about 1:3. In other embodiments, the activator may be used at a weight ratio to the acidic silica nanoparticles in a range from about 1:1.5 to about 1:2.5, such as from about 1:1.6 to about 1:2.

As noted above, the nanosilica dispersion may have an initial pH of less than 6. The activator may increase the pH of the dispersion, causing the acidic nanosilica to aggregate, resulting in the formation of a solid gel. The rate and/or relative amount of activator may impact the time for a solid gel to form within the wellbore, filling the lost circulation zone.

One or more embodiments of the LCM composition also includes a base material additive commonly found in LCM materials. Suitable additives include one or more not limited to the following: polymers, corn stalks, rice hulls, cotton burrs, corn cobs, tree bark, animal hair, mineral fibers, citrus pulp, shredded paper, ground peanut shells, mica flakes, mica, fibrous material, cellophane, walnut shells, flaky material, plastic pieces, marble, wood, wood chips, formica, plant fibers, cottonseed hulls, ground rubber, polymeric materials, and nut hulls, among other LCM materials commonly used in the art.

In other embodiments, however, it has been found that a loss control material consisting essentially of an acidic nanosilica dispersion and an activator may effectively and efficiently form a gel sufficient for reducing lost circulation. In one or more other embodiments, it has been found that a loss control material consisting essentially of an acidic nanosilica dispersion, an activator, and a viscosifier may be used for reducing lost circulation. Suitable examples of viscosifiers include but are not limited to biopolymers such as xanthan gum, welan gum, hydroxy-ethyl-cellulose (HEC), or starch; and synthetic polymers such as 2-acrylamido-2-methylpropane sulfonic acid polymer (AMPS), hydrolyzed polyacrylamide (PHPA), or polyacrylamide (PAM); or a combination thereof.

The convertible composition contains 10 weight % (wt %) or less salts, according to one or more embodiments herein. In other embodiments, the convertible composition may include salts at 9 wt % or less, 8 wt % or less, 7 wt % or less, 6 wt % or less, 5 wt % or less, or 4 wt % or less, 3 wt % or less, 2 wt % or less, 1 wt % or less, or 0.1 wt % or less compared to the overall composition weight. Salts in the convertible composition can result in untimely conversion of the convertible composition into the solid gel loss circulation material. Suitable examples of salts include but are not limited to a monovalent salt such as sodium chloride (NaCl), potassium chloride (KCl), lithium chloride (LiCl), sodium bromide (NaBr), potassium bromide (KBr), or lithium bromide (LiBr), and a divalent salt such as calcium chloride ($CaCl_2$), calcium bromide ($CaBr_2$), or a non-Grignard magnesium salt (where non-Grignard refers to a magnesium salt that is not a Grignard reagent), among other salts commonly used in drilling fluids.

In one or more embodiments, the convertible composition contains a cationic species. The cationic species may be a positive ion or a cationic polymer. Suitable types of positive ions are those with high valence, including aluminum and iron ions. Examples of such positive ions include, but are not limited to aluminum as aluminum oxide ($Al_2O_3$) or aluminum sulfate ($Al_2(SO_4)_3$), and iron as iron (III) chloride $FeCl_3$ or iron (III) sulfate ($Fe_2(SO_4)_3$) Suitable examples of cationic polymers include, but are not limited to a semi-synthetic polymer, a natural polymer, or a combination thereof. Types of polymers may be polyethylenimine (PEI), polyacrylic acid (PAA), cationic cellulose, cationic dextrin, gelatin, or a combination thereof.

The convertible composition may include from 0.1 wt % to 15 wt % of a cationic species, such as from about 0.1 wt % to about 10 wt %, from about 0.5 wt % to about 15 wt %, or from about 0.5 wt % to about 10 wt % compared to the overall composition weight.

EXAMPLE

Example 1: 80 grams of acidic nanosilica dispersion was taken in a beaker. The nanosilica (LEVASIL® CS30-516P) used in one or more embodiments was obtained from AkzoNobel (Amsterdam, Netherlands) and is a colloidal dispersion of poly silica acid. Typical properties of acidic nanosilica dispersion used in one or more embodiments is given in Table 1.

TABLE 1

| Specific surface area ($m^2/g$) | BET specific surface area ($m^2/g$) | wt % $SiO_2$ | pH | Density (g/mL) | Viscosity (cP) | Visual appearance |
|---|---|---|---|---|---|---|
| 160 | 200 | 25 | 3.8 | 1.2 | 3.0 | white/off-white |

20 grams of sodium bicarbonate (activator) was added to the 80 g of acidic nanosilica dispersion in the beaker. The dispersion was mixed well using a stirrer. The nanosilica dispersion along with sodium bicarbonate was subjected to static aging 100 pound per square inch (psi) at 250° F. for 16 hours. After 16 hours of static aging, the nanosilica dispersion was converted into a solid.

As described above, embodiments herein are directed toward a loss circulation material including an acidic nanosilica dispersion and activator. The loss circulation material utilizes network structures formed from the acidic nanosilica and activator gelled material. The nanosilica gelling may advantageously be controlled by varying the relative concentration of the activator, allowing the gel to selectively form in the lost circulation zone. Further, the gelling tendency of the system can be accelerated by changing the pH of the system. Additionally, such gels formed may be used at elevated temperatures and advantageously utilizes environmentally friendly ingredients. Even further, it is theorized that use of such a loss circulation material or a pill containing such a loss circulation material may be compatible with any suitable type of drilling fluid.

In general, an acidic nanosilica is surface modified by a cationic moiety such that the acidic nanosilica may provide a colloidal dispersion. In contrast, an alkaline nanosilica includes a base (such as KOH) to keep the alkaline nanosilica in a colloidal state. Advantageously, the convertible composition of one or more embodiments does not include a base while retaining a colloidal dispersion. The loss circulation material with acidic nanosilica described herein may prevent fluid loss downhole as a gelled solid.

In one or more embodiments, the composition does not include alkaline nanosilica particles or dispersion, or a base. Without wanting to be bound by theory, inclusion of alkaline nanosilica or base would lead to an unstable LCM with one or more embodiments of the acidic nanosilica dispersion herein.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A loss circulation material, consisting essentially of:
   (a) an acidic nanosilica dispersion,
      wherein the acidic nanosilica dispersion consists of acidic silica nanoparticles, an oxy chloride stabilizer, and water, and
      wherein the acidic nanosilica dispersion has a pH in a range of 3 to 6;
   (b) an activator that is of one or more from the group consisting of sodium bicarbonate, sodium chloride, or an amine salt,
      wherein the activator is present in an amount in a range of 1 wt % to 40 wt % of the loss circulation material;

optionally, (c) a cationic species that is a positive ion or a cationic polymer;

optionally, (d) a viscosifier that is one or more selected from the group consisting of a biopolymer and synthetic polymer; and optionally, (e) a salt that is a monovalent salt, a divalent salt, or a combination of monovalent salt and divalent salt.

2. The loss circulation material of claim 1, wherein the activator is sodium bicarbonate.

3. The loss circulation material of claim 1, wherein the biopolymer is one or more selected from the group consisting of xanthan gum, welan gum, hydroxyethyl-cellulose and starch; and wherein the synthetic polymer is one or more selected from the group consisting of 2-acrylamido-2-methylpropane sulfonic acid polymer, hydrolyzed polyacrylamide, and polyacrylamide.

4. The loss circulation material of claim 1, wherein the monovalent salt comprises one or more selected from the group consisting of sodium chloride (NaCl), potassium chloride (KCl), lithium chloride (LiCl), sodium bromide (NaBr), potassium bromide (KBr), and lithium bromide (LiBr); and wherein the divalent salt comprises one or more selected from the group consisting of calcium chloride ($CaCl_2$), calcium bromide ($CaBr_2$), or a non-Grignard magnesium salt.

5. The loss circulation material of claim 1, wherein the cationic polymer is one or more selected from the group consisting of polyethylenimine, polyacrylic acid, cationic cellulose, cationic dextrin, and gelatin.

6. The loss circulation material of claim 1, wherein the acidic nanosilica dispersion comprises acidic silica nanoparticles having:

a density of from 1 to 5 g/mL and a viscosity of from 1 to 50 g/mL; and a specific surface area between 100 $m^2$/g and 500 $m^2$/g, and a BET specific surface area between 100 $m^2$/g and 500 $m^2$/g.

7. The loss circulation material of claim 1, wherein the acidic nanosilica dispersion comprises 5 to 50 wt % of acidic silica nanoparticles, and wherein a weight ratio of the activator to the acidic silica nanoparticles is in a range from about 1:1 to about 1:3.

8. The loss circulation material of claim 1, wherein a weight ratio of the activator to the acidic nanosilica dispersion is in a range from about 1:1 to 1:10.

9. A method of controlling lost circulation in a lost circulation zone in a wellbore, comprising:

introducing a loss circulation material consisting essentially of an acidic nanosilica dispersion, an activator, and optionally a cationic species that is a positive ion or a cationic polymer into the wellbore such that they contact the lost circulation zone, wherein the acidic nanosilica dispersion consists of acidic silica nanoparticles, an oxy chloride stabilizer and water, and has a pH in a range from 3 to 6, wherein the activator is present in an amount in a range of 1 wt % to 40 wt % of the loss circulation material, wherein the acidic nanosilica dispersion, the activator, and the cationic species are not premixed, and forming a gelled solid from the loss circulation material in the lost circulation zone.

10. The method of claim 9, wherein formation of the gelled solid occurs within 6 to 36 hours.

11. The method of claim 9, wherein the acidic nanosilica dispersion comprises acidic silica nanoparticles having:

a density of from 1 to 5 g/mL, a viscosity of from 1 to 50 g/mL, a specific surface area between 100 $m^2$/g and 500 $m^2$/g, and a BET specific surface area between 100 $m^2$/g and 500 $m^2$/g.

12. The method of claim 9, wherein the acidic nanosilica dispersion comprises 30-50 wt % of acidic silica nanoparticles, and wherein a weight ratio of the activator to the acidic silica nanoparticles is in a range from about 1:1 to about 1:3.

13. The method of claim 9, wherein a weight ratio of the activator to the acidic nanosilica dispersion is in a range from about 1:1 to 1:10.

14. A method of controlling lost circulation in a lost circulation zone in a wellbore, comprising:

introducing a loss circulation material consisting essentially of an acidic nanosilica dispersion, an activator, and optionally a cationic species that is a positive ion or a cationic polymer into the wellbore such that they contact the lost circulation zone, wherein the acidic nanosilica dispersion consists of acidic silica nanoparticles, an oxy chloride stabilizer and water, and has a pH in a range from 3 to 6, wherein the activator is present in an amount in a range of 1 wt % to 40 wt % of the loss circulation material, wherein the acidic nanosilica dispersion, the activator, and the cationic species are premixed, and forming a gelled solid from the loss circulation material in the lost circulation zone.

15. The method of claim 14, wherein the acidic nanosilica dispersion comprises acidic silica nanoparticles having:

a density of from 1 to 5 g/mL, a viscosity of from 1 to 50 g/mL, a specific surface area between 100 $m^2$/g and 500 $m^2$/g, and a BET specific surface area between 100 $m^2$/g and 500 $m^2$/g.

16. The method of claim 14, wherein the acidic nanosilica dispersion comprises 30-50 wt % of acidic silica nanoparticles, and wherein a weight ratio of the activator to the acidic silica nanoparticles is in a range from about 1:1 to about 1:3.

17. The method of claim 14, wherein a weight ratio of the activator to the acidic nanosilica dispersion is in a range from about 1:1 to 1:10.

* * * * *